(12) United States Patent
Matsumoto et al.

(10) Patent No.: US 7,221,846 B2
(45) Date of Patent: May 22, 2007

(54) OPTICAL COMMUNICATION SYSTEM

(75) Inventors: Kenji Matsumoto, Kanagawa-ken (JP); Hiroki Takahashi, Fujinomiya (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/361,962

(22) Filed: Feb. 27, 2006

(65) Prior Publication Data

US 2006/0193580 A1  Aug. 31, 2006

(30) Foreign Application Priority Data

Feb. 25, 2005  (JP)  ............... 2005/050315

(51) Int. Cl.
*G02B 6/00* (2006.01)
(52) U.S. Cl. ...................... 385/143; 385/122
(58) Field of Classification Search ............ 385/14–15, 385/122–128, 143, 145; 264/1.24, 1.29
See application file for complete search history.

(56) References Cited

U.S. PATENT DOCUMENTS

| 5,541,247 A | 7/1996 | Koike |
| 5,986,790 A * | 11/1999 | Ota et al. ...................... 398/1 |
| 7,035,493 B2 * | 4/2006 | Fujita et al. .................. 385/15 |
| 2005/0232537 A1 | 10/2005 | Ishii et al. |

FOREIGN PATENT DOCUMENTS

JP   2003-192708 A   7/2003

* cited by examiner

*Primary Examiner*—Quyen Leung
(74) *Attorney, Agent, or Firm*—Sughrue Mion, PLLC

(57) ABSTRACT

In an optical communication system in which communication is conducted by transmitting light through a plastic optical fiber with a core diameter in the range from 300 to 600 μm, the average beam diameter and beam divergence angle expressed in terms of numerical aperture (NA) of the light at the input face of the optical fiber are set less than or equal to 250 μm, more preferably less than or equal to 200 μm, and less than or equal to 0.25, more preferably less than or equal to 0.2 respectively.

13 Claims, 3 Drawing Sheets

OPTICAL COMMUNICATION SYSTEM

BACKGROUND OF THE INVENTION

1. Field of the Invention

The present invention relates to an optical communication system that uses a plastic optical fiber as the transmission line.

2. Description of the Related Art

In optical communication systems, single mode or multimode optical fibers made mainly of silica glass have been used as the optical transmission lines. In general, the core diameter of these optical fibers is less than 100 μm, and very precise core alignment with an allowance of few micrometers is required when splicing the fibers. Consequently, installation work for optical fibers under common environments, including construction sites or the like, is no easy task. This has been an obstacle that lies in the way toward wider use of optical communication systems using optical fibers.

In the mean time, plastic optical fibers having larger core diameters for use with optical communication systems have also been developed as described, for example, in U.S. Patent Application Publication No. 20050232537. Most of these fibers, however, have step index structures due to manufacturing constraints, making them difficult to transmit signals at high speeds over a long distance. Recently, however, a graded index type plastic optical fiber (GI-POF) that has a large core diameter, yet without these drawbacks described above and is applicable to high speed transmission has proposed, and is currently under development for practical applications.

Further, there is a growing demand in the market for an optical communication system capable of transmitting both high and low speed signals. Consequently, a communication system having two transmitters is proposed. One of the transmitters is equipped with a semiconductor laser for high speed signal transmission, and the other is equipped with an inexpensive RC-LED (Resonant Cavity Light Emitting Diode) for low speed signal transmission. The system uses a GI-POF applicable to both high and low speed signal transmission as the transmission line, and either of the transmitters is selected according to the speed of the signal to be transmitted.

As for the plastic fibers applicable to both high and low speed signal transmission, medium diameter GI-POFs with a core diameter in the range from 300 to 600 μm and a numerical aperture in the range around from 0.2 to 0.4 have been developed. Hereinafter, the medium diameter GI-POF will be described in detail.

Basically, such a GI-POF includes a core with a diameter in the range from 300 to 600 μm, and a clad with a thickness of several tens of micrometers surrounding the core. The refractive index of the core is slightly higher than that of the clad in order to confine the propagating light within the core as in an ordinary optical waveguide. A low molecular weight compound having a high refractive index with a large molecular volume is added to the core as a refractive index adjuster. The compound is distributed in the radial direction with the center of the core having a highest refractive index. The refractive index profile "g" within the core is adjusted to a value in the range from 1 to 5. The numerical aperture (NA) of the optical fiber may be defined by the following formula using the maximum refractive index $N_1$ of the core and the refractive index $N_2$ of the clad. In the medium diameter GI-POF, the difference $\Delta N$ $\{=(N_1+N_2)/N_1\}$ is adjusted so that the value of the NA falls in the range from 0.2 to 0.4.

$$NA = N_1 \sqrt{2\Delta N}$$

In the mean time, any material may be used for the clad as long as it has favorable characteristics for optical transmission, such as providing a lower refractive index than that of the core and the like. In particular, however, use of fluorinated polymers is preferable from the view point of refractive index. More specifically, polyvinylidene fluoride (PVDF, $N_2$=1.42 for wavelength at 650 nm) may be listed as one of such materials. Likewise, as for the material of the core, any material may be used as long as it has favorable characteristics for optical transmission. In particular, however, polymers having high optical transparency are preferable. Here, use of amorphous polymers is preferable in order to prevent optical anisotropy from developing or to reduce it. Further, use of polymers having superior adhesiveness with each other is preferable for the core and clad. Still further, use of polymers having superior mechanical and thermal resistance properties is more preferable.

Specific material examples of the core may include (meta) acrylic esters (fluorine-free (meta) acrylic ester, fluorine containing (meta) acrylic ester), styrene compounds, vinylesters, polymerized compounds produced using bisphenol A, which is a raw material of polycarbonates and the like as polymerizable compounds. Further, homopolymers produced by using these materials as raw materials and polymerizing each of the materials, copolymers produced by combining two or more of the materials in various ways and polymerizing them, or mixtures produced by combining the honopolymers and copolymers in various ways may be used as the material of the core. Of these, (meta) acrylic esters or fluorine polymer based materials are particularly preferable to form an optical transmission body. In the mean time, if an optical element is used for near-infrared applications (e.g., light source, transmission, or the like at a wavelength in the range from 750 to 850 nm), an absorption loss occurs due to C—H binding forming the optical element. The wavelength region where the absorption loss occurs may be shifted to a longer wavelength region by the use of a polymer in which hydrogen atoms in C—H binding are substituted by deuterium atoms, fluorine atoms, or the like as described, for example, in U.S. Pat. No. 5,541,247 and Japanese Unexamined Patent Publication No. 2003-192708. In this way, the transmission loss of the light transmitted through the optical fiber may be reduced. Such polymers include deuterated polymethyl methacrylate (PMMA-d8), polytrifluoroethyl methacrylate (P3FMA), polyhexafluoro isopropyl 2-fluoroacrylate (HFIP 2-FA), and the like. Preferably, impurities and foreign substances that may act as light scattering sources are removed sufficiently from the raw material compound prior to polymerization in order to ensure the transparency of the material after polymerization.

In the mean time, it has been revealed that when an optical signal is transmitted through the medium diameter plastic optical fiber with a core diameter in the range from 300 to 600 μm as described above by the optical communication system using the transmitter equipped with a RC-LED for low speed transmission, the transmitted optical signal may be attenuated by the optical fiber greater than expected. More specifically, as shown in FIG. 7, light L emitted from a light source constituted by a RC-LED 2 having a luminous section 2 with a diameter of 100 μm enclosed by a transparent resin 4 having a lens-like convex section 3 was inputted to an optical fiber (GI-POF) with a core diameter of 500 μm and transmitted through the fiber, an unexpectedly large amount of transmission loss exceeding 250 dB/km was measured.

In view of the circumstances described above, it is an object of the present invention to provide an optical communication system that uses a medium diameter plastic optical fiber, such as the GI-POF or the like, yet capable of achieving low transmission loss.

SUMMARY OF THE INVENTION

The optical communication system according to the present invention is an optical communication system in which communication is conducted by transmitting light through a plastic optical fiber with a core diameter in the range from 300 to 600 μm, wherein:

the light is condensed and converged at a point adjacent to the input face of the plastic optical fiber; and the average beam diameter and beam divergence angle expressed in terms of numerical aperture (NA) of the light at the input face of the optical fiber are less than or equal to 250 μm and less than or equal to 0.25 respectively.

Preferably, the light to be transmitted by the communication system of the present invention is condensed such that the spot shape of the light becomes a complete circle at the input face of the optical fiber. But it may be condensed such that the spot shape becomes an ellipse or the like. In this case, the referent of "beam diameter" should mean the average diameter of the beam spot.

More preferably, in the optical communication system constructed in the manner as described above, the average beam diameter and beam divergence angle expressed in terms of numerical aperture (NA) of the light at the input face of the optical fiber are less than or equal to 200 μm and less than or equal to 0.2 respectively.

More preferably, in the optical communication system constructed in the manner as described above, a semiconductor laser, a LED, or a RC-LED is used as the light source for providing the light to be transmitted through the optical fiber; an optical system for magnifying an image is provided between the luminous section of the light source and the optical fiber; and when the maximum outer dimension of the luminous section is expressed as X (μm), the magnifying power of the optical system is less than or equal to 250/X.

Further, a graded index type optical fiber in which the refractive index thereof varies continuously, or a step index type optical fiber in which the refractive index thereof varies in stepwise may preferably be used as the optical fiber described above.

The inventors of the present invention have found out the cause of the excessive amount of transmission loss of the medium diameter GI-POF which is applicable from low to high speed optical communication. FIG. 2 shows an investigation result with regard to the relationship between the diameter of the light beam incident on the medium diameter GI-POF and measured amount of transmission loss of the fiber. Here, light having a divergence angle of 0.2 expressed in terms of numerical aperture (NA) at the input face of an optical fiber 10 was used as the light L inputted to the optical fiber 10 as shown in FIG. 3. The diameter of the light beam is defined by $1/e^2$. As FIG. 2 shows clearly, it may be said that the smaller the diameter of the light beam inputted to the optical fiber, the smaller the amount of transmission loss. In order to achieve a transmission loss level of less than or equal to 200 dB/km, which is a target loss level for practical use, it is necessary that the diameter of the incident beam is less than or equal to approximately 250 μm.

FIG. 4 shows an investigation result with regard to the relationship between the divergence angle of the light beam incident on the optical fiber and the amount of transmission loss of the fiber. In FIG. 4, the divergence angle of the light beam is expressed in terms of numerical aperture (NA). The amount of transmission loss was measured by transmitting light having a beam diameter of 200 μm at the input face of the GI-POF. As shown in FIG. 4, it has been revealed that the smaller the numerical aperture (NA), the less amount of transmission loss under the condition in which the light with a constant beam diameter at the input face is inputted to the optical fiber.

FIG. 5 is a graph illustrating the amounts of transmission loss represented in contour plots using the numerical aperture (NA) and the diameter of the light beam incident on the GI-POF input face as the parameters. As illustrated in FIG. 5, the amount of transmission loss of the medium diameter GI-POF is greatly influenced by the beam diameter and numerical aperture (NA) of the incident light. That is, it has been revealed that the smaller the beam diameter and numerical aperture of the incident light, the smaller the amount of transmission loss.

More specifically, in order to achieve a transmission loss level of less than or equal to 200 dB/km, which is the target loss level for practical use, it is necessary to limit the beam diameter less than or equal to approximately 250 μm, and the numerical aperture less than or equal to approximately 0.25 for the light beam incident on the GI-POF input face. More preferably, it is necessary to limit the beam diameter less than or equal to approximately 200 μm, and the numerical aperture less than or equal to approximately 0.2 for the light beam incident on the GI-POF input face. Based on this knowledge, the optical communication system of the present invention is constructed such that the average beam diameter and the beam divergence angle expressed in terms of numerical aperture (NA) at the input face of the optical fiber are less than or equal to 250 μm and less than or equal to 0.25 respectively. This may achieve a sufficiently low level of transmission loss for practical use. Further, if the optical communication system is constructed such that the average beam diameter and the beam divergence angle expressed in terms of numerical aperture (NA) at the input face of the optical fiber are less than or equal to 200 μm and less than or equal to 0.2 respectively, further low level transmission loss may be achieved.

Incidentally, in the configuration shown in FIG. 7, when the light L having a beam diameter of around 350 μm and a numerical aperture (NA) of around 0.15 at the input face of the GI-POF 6 emitted from the RC-LED 2 integrally formed with the resin 4 having a lens-like convex section and enclosing the RC-LED 2 was inputted to the GI-POF 6, a large amount of transmission loss was observed, deviating largely from the optimum region shown in FIG. 5 (point indicated by X in FIG. 5).

DESCRIPTION OF THE PREFERRED EMBODIMENTS

Hereinafter, embodiments of the present invention will be described with reference to accompanying drawings.

In the present embodiment, optical designs are performed with the design target value of less than or equal to 200 μm for the average beam diameter, and less than or equal to 0.2 for the numerical aperture (NA) of the light at the input face of the optical fiber. As for the light source, the following three cases are mainly considered. Namely, use of (1) a semiconductor laser having a single luminous section (edge emitting type or VCSEL: surface emitting type), (2) an array VCSEL constituted by a plurality of luminous sections, and (3) a RC-LED described above.

Case 1: Use of a Semiconductor Laser Having a Single Luminous section (Edge Emitting Type or VCSEL)

Figure 5:
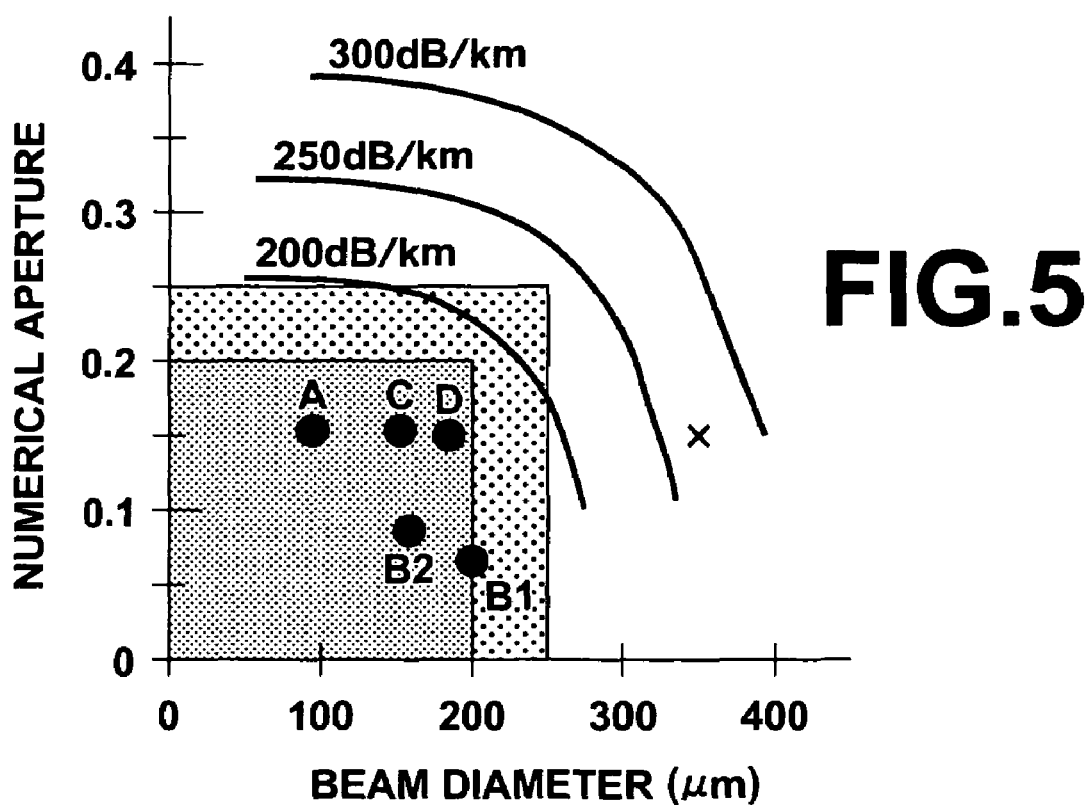
FIG. 5 is a graph illustrating the relationship among the numerical aperture (NA) of the light incident on an optical fiber, diameter of the light beam at the input face of the optical fiber, and amount of transmission loss of the fiber.

For the light source that may be deemed as an ideal point light source, such as a semiconductor laser that emits light from a single spot, the design target values described above may be achieved with relative ease. Firstly, the diameter of the luminous section of the semiconductor laser of edge emitting type or VCSEL is less than or equal to 20 μm, and the divergence angle of the light beam emitted from the luminous section expressed in terms of numerical aperture is less than or equal to 0.6 at most. Hereinafter, the divergence angle of the light beam emitted from the light source expressed in terms of numerical aperture is also referred to as "emission NA", and the divergence angle expressed in terms of numerical aperture of the light incident on the input face of the optical fiber is also referred to as "incident NA". Further, the average beam diameter of the light at the input face of the optical fiber is also referred to as "incident beam diameter". Assuming that the diameter of the luminous section of the semiconductor laser is 20 μm and emission NA is around 0.6, and if an optical system of 4× magnifying power is used, then an incident beam diameter of 80 μm and an incident NA of 0.15 (¼ of the emission NA) may be achieved. This result falls well within the optimum region (point A in FIG. 5).

In general, if the diameter of the luminous section of the light source is assumed to be W, numerical aperture (NA) representing the divergence angle of the light beam emitted from the light source is assumed to be P, and magnifying power of the optical system placed between the light source and GI-POF is assumed to be M, then the diameter of the light beam incident on the input face of the optical fiber placed at the light converging position is expressed as W×M, and the numerical aperture (NA) of the incident light beam is expressed as P/M. The value of 80 μm for the incident beam diameter and the value of 0.15 for the incident NA are obtained based on these relationships. Further, these relationships indicate that the average value of the beam diameter at the input face of the optical fiber may be kept invariably less than or equal to 250 μm, if the magnifying power of the optical system is less than or equal to 250/X, where X is a maximum outer dimension (μm) of the luminous section.

Further, when an optical system of 10× magnifying power is used, the incident beam diameter becomes 200 μm and the incident NA becomes 0.06 (1/10 of the emission NA). If an optical system of 8× magnifying power is used, the incident beam diameter becomes 160 μm and the incident NA becomes about 0.08 (⅛ of the emission NA). In both cases, the result falls within the optimum region shown in FIG. 5, that is, the former corresponds to point B1 and the latter corresponds to point B2 in FIG. 5.

As described above, the design target value of less than or equal to 200 μm for the average beam diameter, and less than or equal to 0.2 for the numerical aperture (NA) of the light at the input face of the optical fiber may be achieved by placing an optical system of 4× to 10× magnifying power between the semiconductor laser and optical fiber.

Case 2: Use of an Array VCSEL Constituted by a Plurality of Luminous Sections

Figure 6:
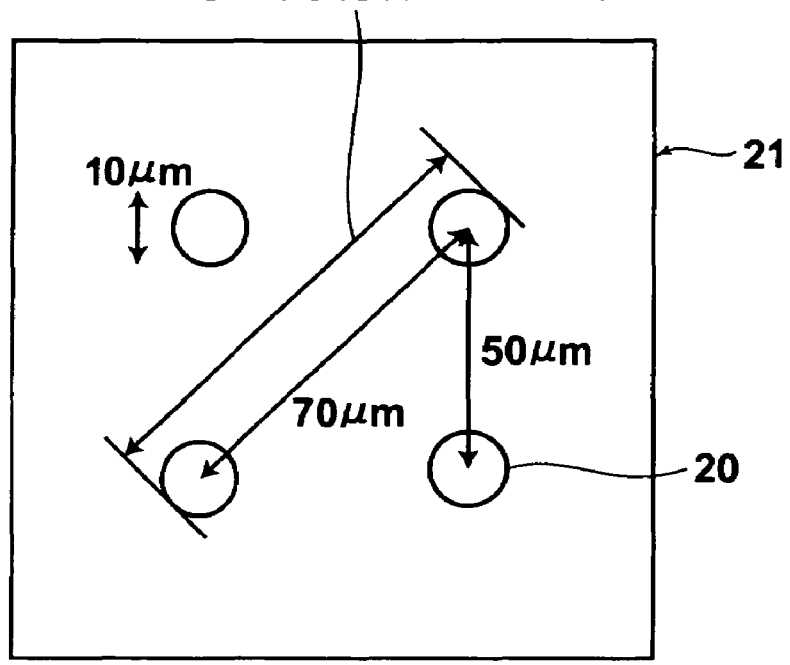
FIG. 6 is a drawing for explaining multi-spot VCSEL.
Figure 7:
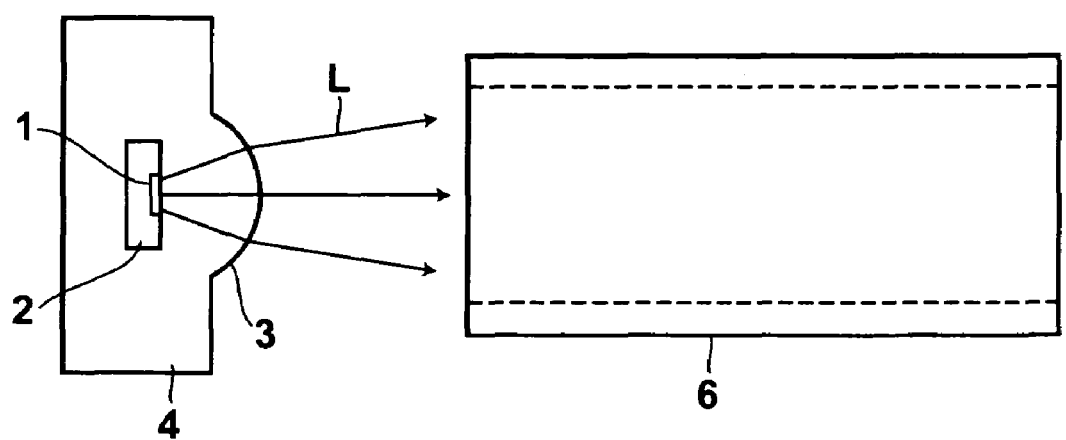
FIG. 7 is a schematic block diagram of a conventional optical communication system illustrating the configuration thereof.

For a VCSEL having a plurality of luminous sections, it is necessary to take into account the distance between the luminous sections. Supposing the case in which a four spot array VCSEL having luminous sections 20 on the surface of a square shown in FIG. 6 is used here. If the spot distance is 50 μm, the distance along the diagonal line is 70 μm. If the diameter of each of the luminous section is 10 μm, the VCSEL should be deemed to be an equivalent to the light source having a maximum outer dimension of 80 μm. If the emission NA of the array VCSEL 21 is assumed to be 0.3, an incident beam diameter of 160 μm, and an incident NA of 0.15 may be achieved by using an optical system of 2× magnifying power. This result falls well within the optimum region (point C in FIG. 5).

Case 3: Use of RC-LED

In this case, a RC-LED having a luminous section with a diameter in the range from 50 to 100 μm is generally selected in view of reliability. That is, a smaller diameter of the luminous section results in an unfavorably excessive current density. Accordingly, the diameter of the luminous section may be considered in the same way as in the case 2 where a semiconductor laser having a plurality of luminous sections is used as the light source. If the diameter of the luminous section of the RC-LED is assumed to be 100 μm, and emission NA is assumed to be 0.3, an incident beam diameter of 180 μm and an incident NA of 0.17 (approximately ½ of the emission NA) may be achieved by using an optical system of 1.8× magnifying power. This result falls well within the optimum region (point D in FIG. 5).

Figure 1:
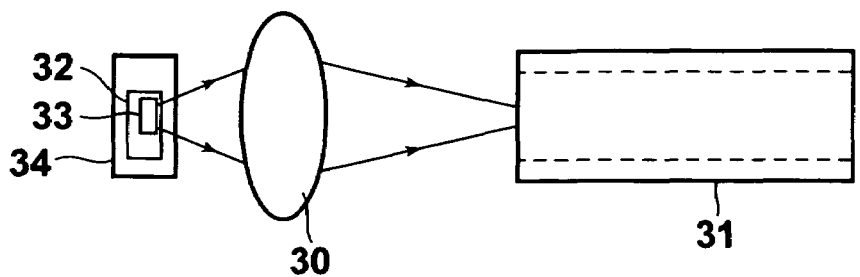
FIG. 1 is a schematic block diagram of the optical communication system according to an embodiment of the present invention illustrating the configuration thereof.
Figure 2:
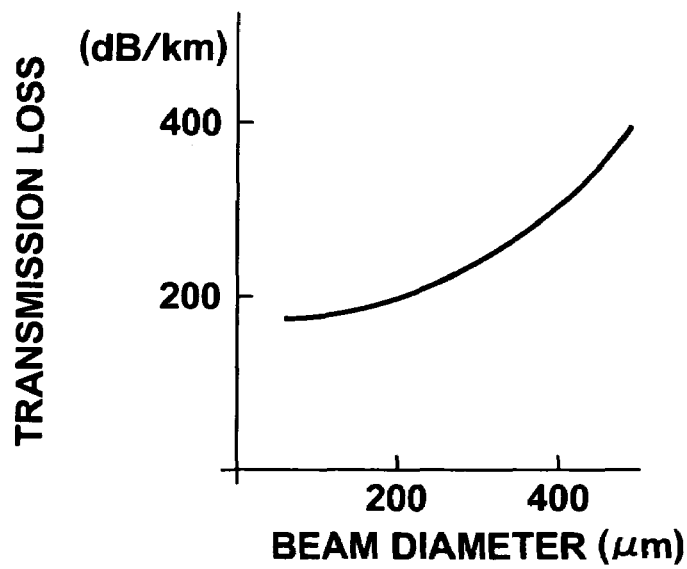
FIG. 2 is a graph illustrating the relationship between the diameter of the light beam at the input face of an optical fiber and the amount of transmission loss of the fiber.
Figure 3:
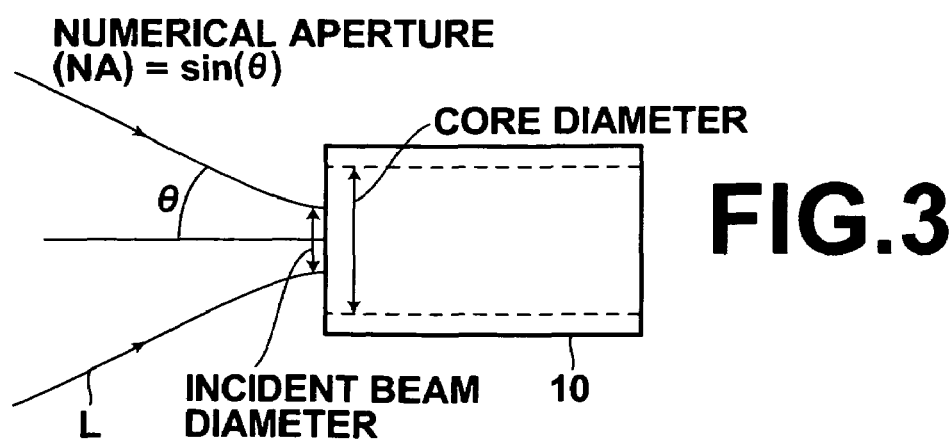
FIG. 3 is a drawing for explaining the numerical aperture (NA) of the light incident on an optical fiber.
Figure 4:
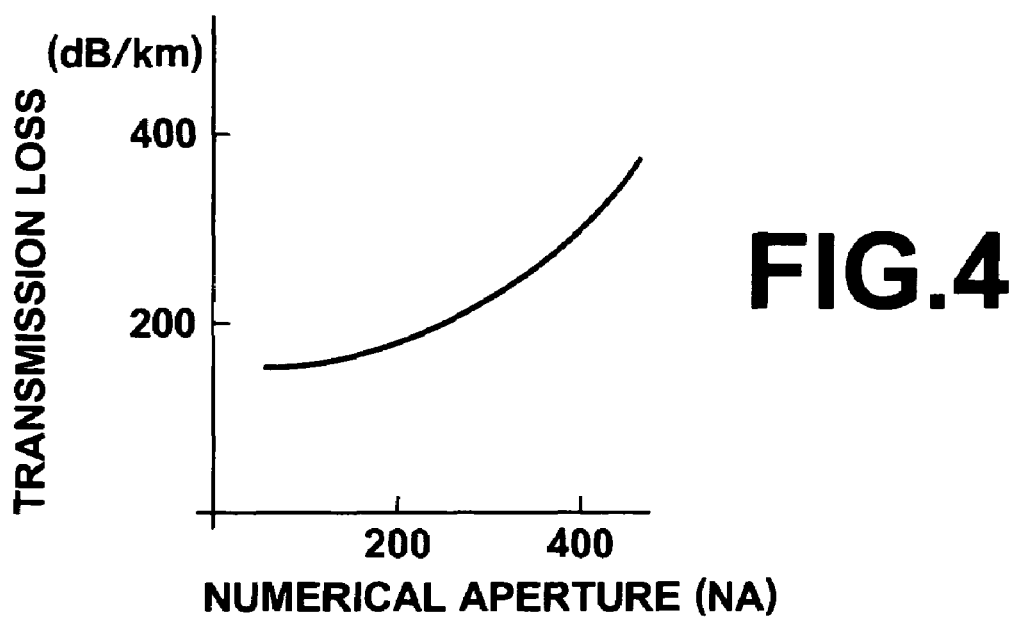
FIG. 4 is a graph illustrating the relationship between the numerical aperture (NA) of the light incident on an optical fiber and the amount of transmission loss of the fiber.

Hereinafter, a more specific embodiment will be described. FIG. 1 is a schematic block diagram of the optical communication system according to the present embodiment illustrating the configuration thereof. The optical communication system uses a RC-LED as the light source, and a medium diameter GI-POF as the optical fiber.

In the present embodiment, a GI-POF 31 having a core diameter of 450 μm is used as the optical fiber. The diameter of a luminous section 33 of a RC-LED 32 serving as the light source is 100 μm, and the emission NA of light beam L emitted from the light source is 0.3. In the present embodiment, the RC-LED 32 is enclosed in a resin 34 having flat surfaces, instead of a plastic resin having a convex section that provides a lens effect. A lens 30 for inputting the light beam L emitted from the RC-LED 32 to the GI-POF 31 is placed at the position where the magnifying power of the lens 30 becomes 1.8×. Each of these elements is arranged such that the input face of the GI-POF is placed at the light converging position of the lens 30. The present embodiment configured in the manner as described above realized an incident beam diameter of 180 μm, and an incident NA of 0.17. This result falls within the optimum region illustrated in FIG. 5.

The light beam with an output power of 500 μW emitted toward the lens 30 was obtained from the RC-LED 32 molded by a resin by flow a current of 10 mA in the RC-LED 32, and the light beam with a power of 350 μW that corresponds to 70% of the output power was optically coupled to the medium diameter POF 31.

The output power of the light beam outputted from the GI-POF 31 was 35 μW after being transmitted therethrough by 50 m. This means that the transmission loss of 10 dB at the distance of 50 m is achieved. That is, the present embodiment has successfully realized transmission loss of 200 dB/km as designed.

For comparison purposes, when a light beam having an incident beam diameter of 85 μm and an incident NA of 0.3 provided by an optical system of 1× magnifying power was inputted to the POF 31, the transmission loss increased to 250 dB/km. This has confirmed the advantageous effects for setting the incident NA and incident beam diameter within the respective ranges defined by the present invention.

What is claimed is:

1. An optical communication system in which communication is conducted by transmitting light through a plastic optical fiber with a core diameter in the range from 300 to 600 μm, wherein:
   the light is condensed and converged at a point adjacent to the input face of the plastic optical fiber; and
   the average beam diameter and beam divergence angle expressed in terms of numerical aperture (NA) of the light at the input face of the optical fiber are less than or equal to 250 μm and less than or equal to 0.25 respectively.

2. The optical communication system according to claim 1, wherein the average beam diameter and beam divergence angle expressed in terms of numerical aperture (NA) of the light at the input face of the optical fiber are less than or equal to 200 μm and less than or equal to 0.2 respectively.

3. The optical communication system according to claim 1, wherein:
   a semiconductor laser, a LED, or a RC-LED is used as the light source for providing the light to be transmitted through the optical fiber;
   an optical system for magnifying an image is provided between the luminous section of the light source and the optical fiber; and
   when the maximum outer dimension of the luminous section is expressed as X (μm), the magnifying power of the optical system is less than or equal to 250/X.

4. The optical communication system according to claim 2, wherein:
   a semiconductor laser, a LED, or a RC-LED is used as the light source for providing the light to be transmitted through the optical fiber;
   an optical system for magnifying an image is provided between the luminous section of the light source and the optical fiber; and
   when the maximum outer dimension of the luminous section is expressed as X (μm), the magnifying power of the optical system is less than or equal to 250/X.

5. The optical communication system according to claim 1, wherein the optical fiber is a graded index type plastic optical fiber in which the refractive index thereof varies continuously.

6. The optical communication system according to claim 2, wherein the optical fiber is a graded index type plastic optical fiber in which the refractive index thereof varies continuously.

7. The optical communication system according to claim 3, wherein the optical fiber is a graded index type plastic optical fiber in which the refractive index thereof varies continuously.

8. The optical communication system according to claim 1, wherein the optical fiber is a step index type optical fiber in which the refractive index thereof varies in stepwise.

9. The optical communication system according to claim 2, wherein the optical fiber is a step index type optical fiber in which the refractive index thereof varies in stepwise.

10. The optical communication system according to claim 3, wherein the optical fiber is a step index type optical fiber in which the refractive index thereof varies in stepwise.

11. The optical communication system according to claim 1, wherein the optical fiber includes a core made of deuterated polymethyl methacrylate (PMMA-d8).

12. The optical communication system according to claim 1, wherein the optical fiber includes a core made of polytrifluoroethyl methacrylate (P3FMA).

13. The optical communication system according to claim 1, wherein the optical fiber includes a core made of polyhexafluoro isopropyl 2-fluoroacrylate (HFIP 2-FA).

* * * * *